3,669,597
APPARATUS FOR THE PRODUCTION OF SMALL CONCRETE ELEMENTS

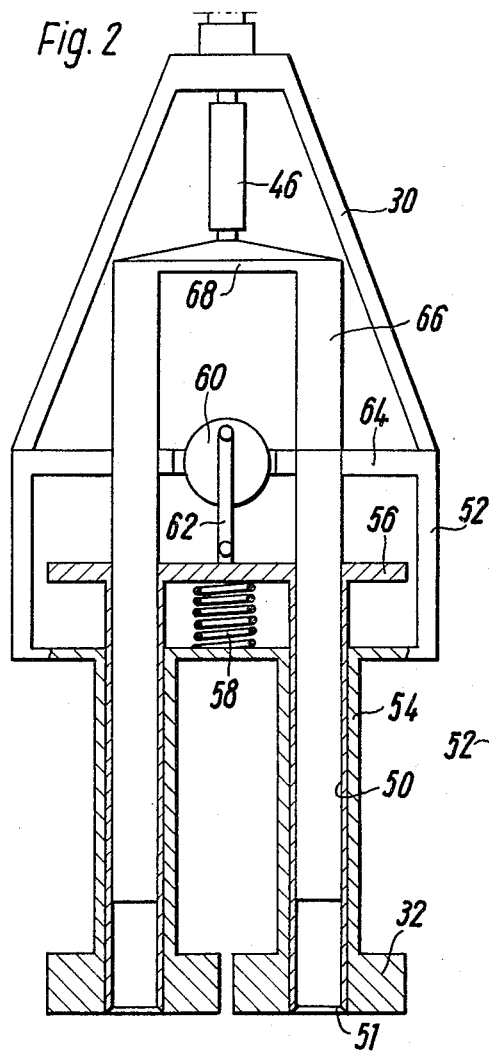
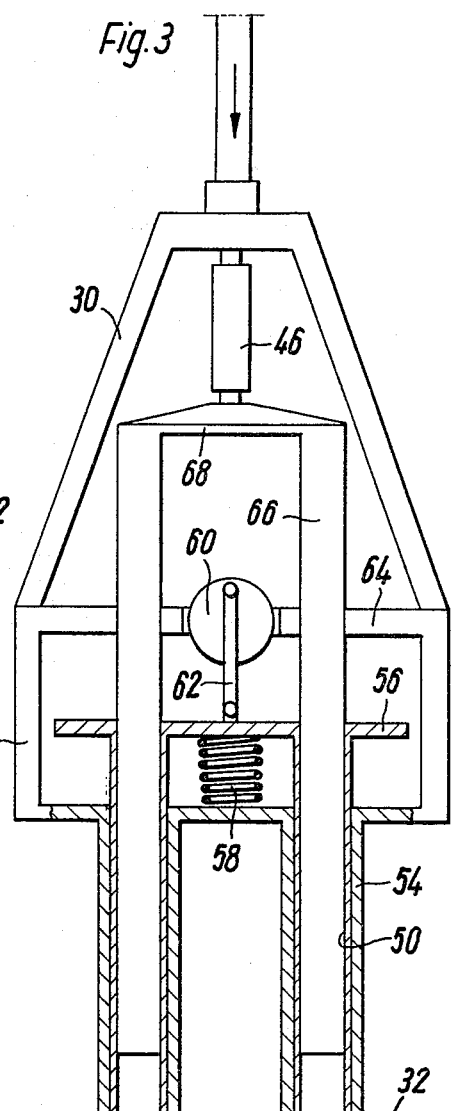
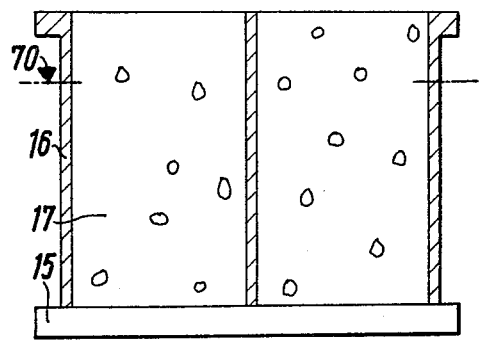
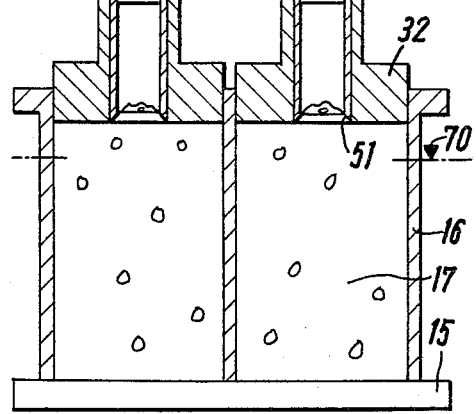

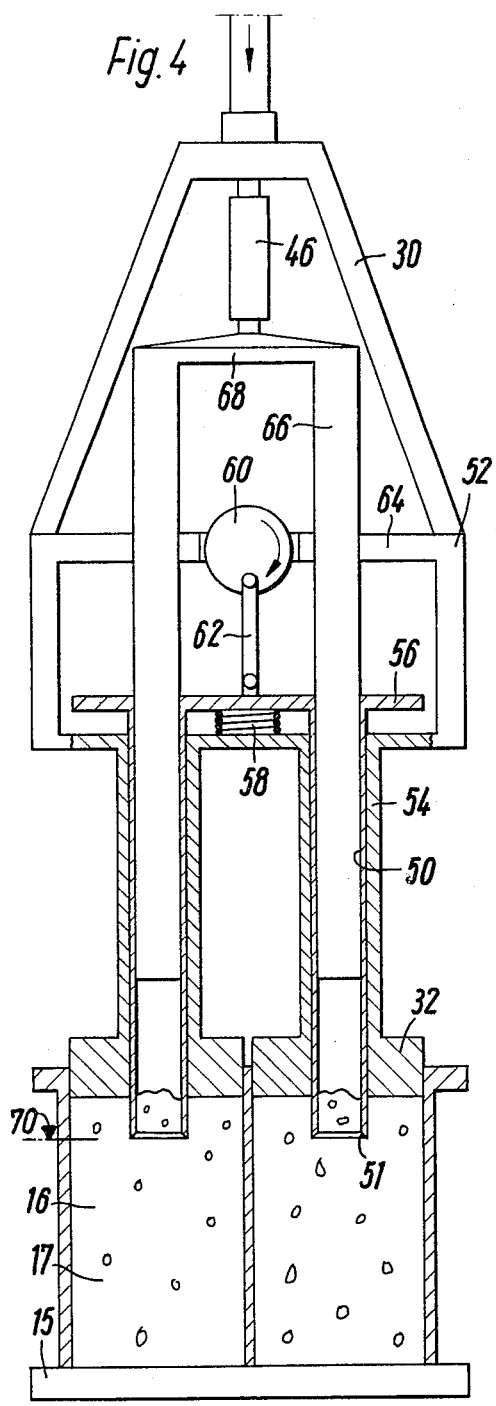
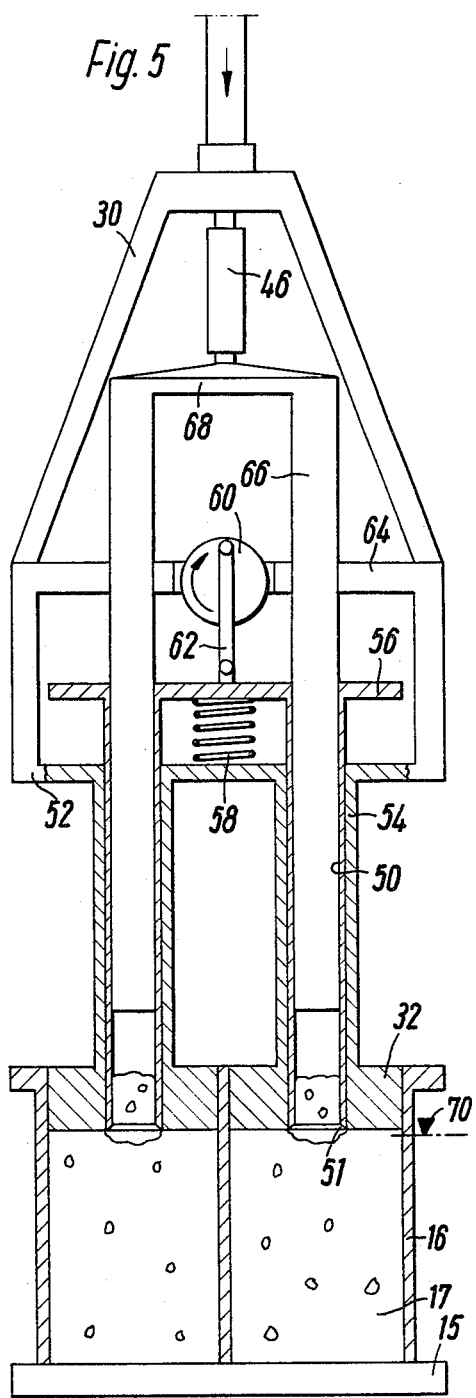

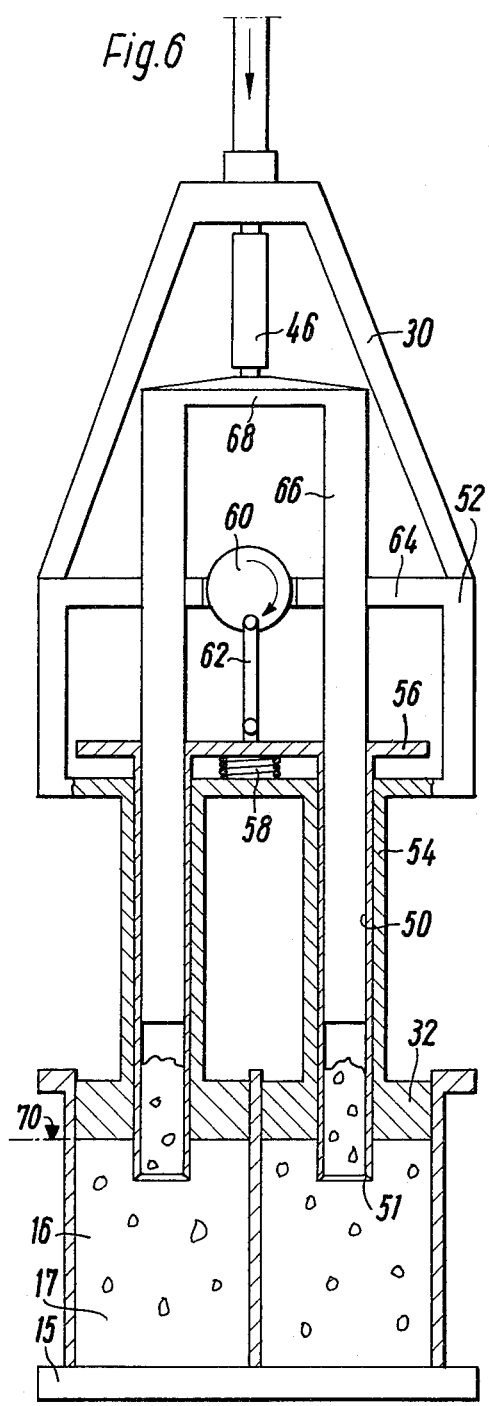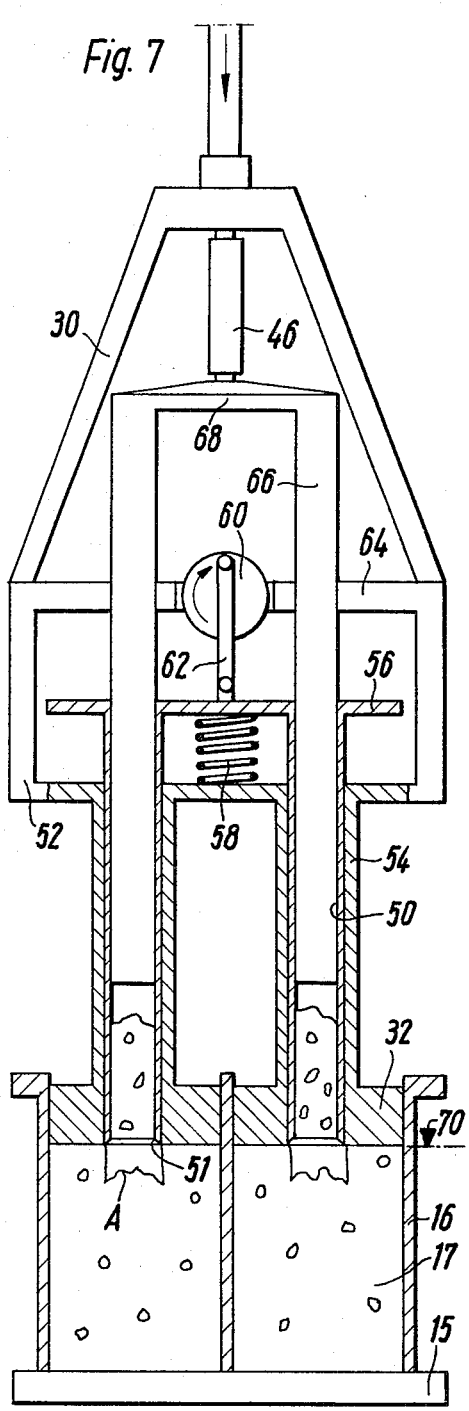

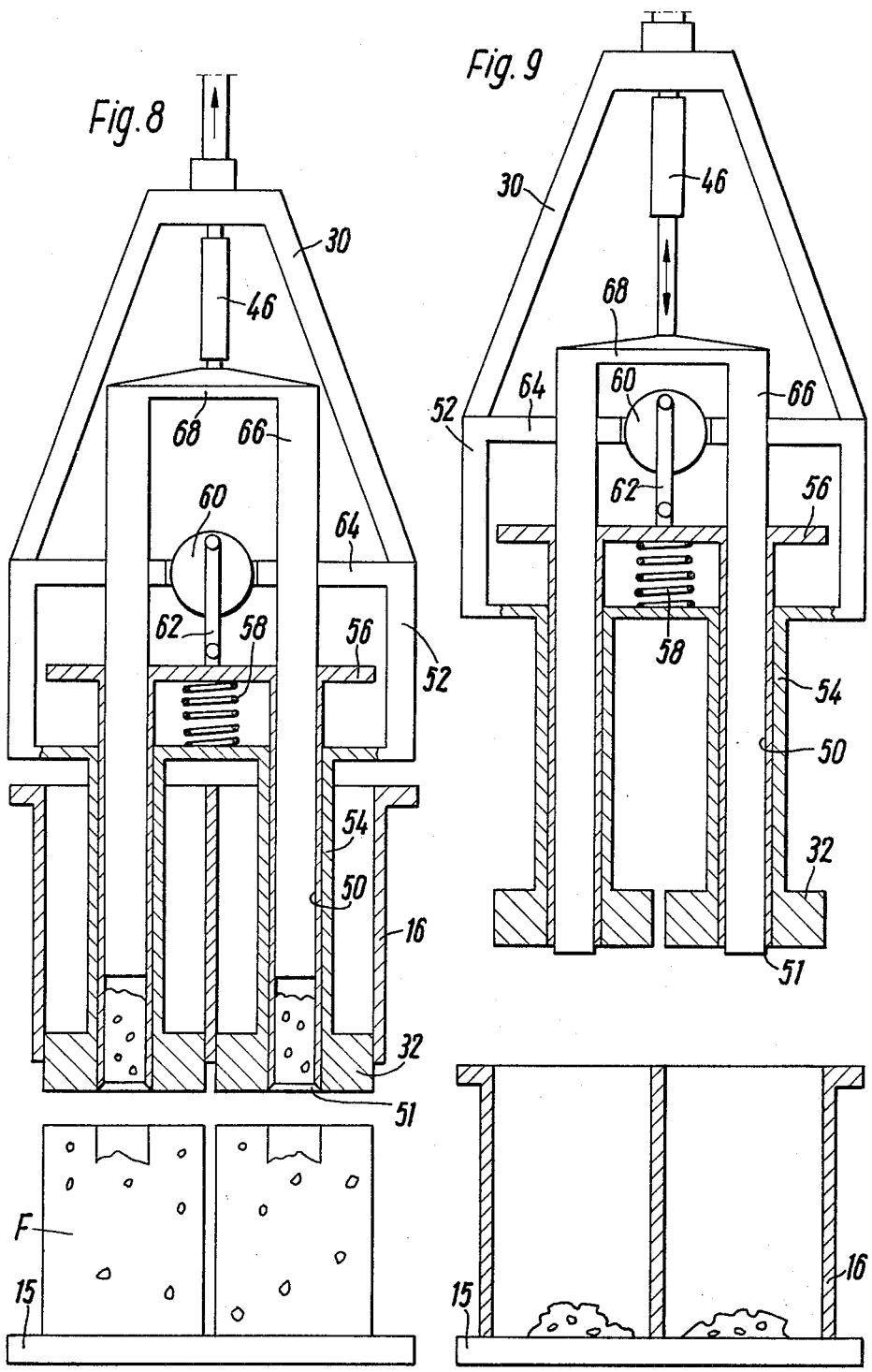

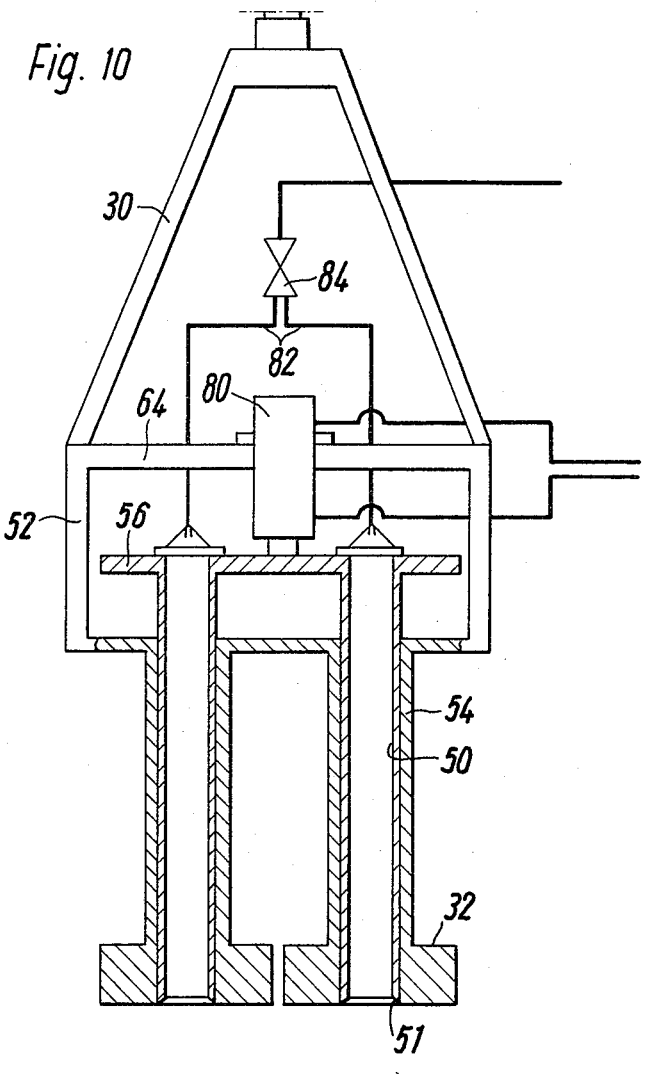
Fig. 10
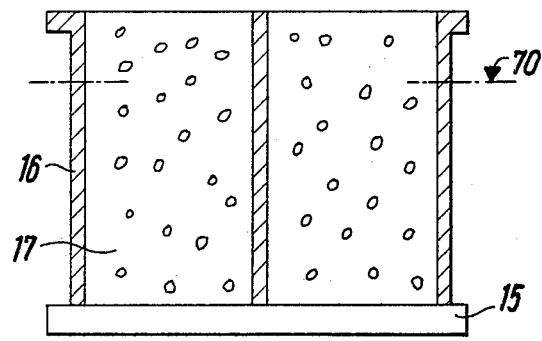

Wolfgang Schneider, Mushardweg 8, and Klaus Schneider, Feldweg 18, both of 2150 Buxtehude, Germany
Filed May 22, 1970, Ser. No. 39,821
Claims priority, application Germany, May 12, 1969, P 19 26 263.6; Dec. 9, 1969, P 19 61 098.1
Int. Cl. B28b 7/00
U.S. Cl. 425—216  12 Claims

ABSTRACT OF THE DISCLOSURE

Manufacturing of small concrete elements is improved by compacting the concrete mix in a mould and removing any possible filling surplus during compaction, the surplus being removed in a plurality of steps. A novel apparatus for the production of small concrete elements comprises an upwardly open mould and a press ram which is movable in a vertical direction and the ram plate of which may cover the free upper cross section of the mould said ram plate being provided with means for the removal of a filling surplus from the mould, which means is movable in a vertical direction independently of the ram.

---

The invention relates to a method and apparatus for producing elements of concrete and similar settable materials and in particular to concrete paving blocks, and slabs, and bank reinforcing elements which are produced in large quantities by a substantially automatic process. To produce such articles a mould or a mould frame which is subdivided into individual chambers, is filled with for example concrete. The concrete is then compacted in the mould, by vibrating the mould, whilst at the same time a compaction ram engaging the concrete in the individual chambers.

According to another known method, the mold contents are compacted solely through large hydraulic pressure by means of a press ram.

Because of unavoidable variations in the composition of the concrete, a differing degree of compactability results. Because of the level of production cannot be initially determined. For the reasons mentioned above, variations occur from one production run to the next. The differing degrees of compactness and level of concrete in the mould results in differences in the dimensions of the finished element from different sections of the mould and from one production run to another.

The invention starts from the basic idea of removing, during the compaction procedure, any surplus concrete from the mould which has been filled with a measured quantity of concrete. Even with a very accurate preceding measurement and the use of a concrete which can be considered as homogeneous (uniform grain size) by and large, small quantities of such a concrete reveal different compaction properties. These differences in concrete ensure that, even when using a previously very accurately measured filling quantity, the compaction in the individual chambers of a mould or of a mould frame differs one from another and that from one production run to the next the levels of compaction of the respectively produced groups are different. The variations are compensated by a removal of the filling surplus during the compaction procedure. The filling surplus can be eliminated in such a way that the ram of the press ram for each mould or mould chamber has at least one removal aperture, into which any surplus quantity of concrete penetrates during the compaction and is thereby removed from the mould.

Of course, this method frequently requires a considerable expenditure of time, since the concrete poured into the mould has only a slight flow capacity. In unfavourable cases, an end state of the compaction is achieved before sufficient concrete has entered the removal aperture. In order to abridge the method and to arrive at production procedures which occur in periods of time which are at all times equal and in which the blocks are uniform, it is in accordance with the invention provided that for the filling of the mould from the start a quantity of concrete containing a surplus is measured off and, after commencement of the compaction, the filling surplus is removed in individual quantites one after another. Preferably the compaction pressure on the concrete is substantially maintained during the removal. In accordance with a further feature of the invention, provision is made for the fact that the concrete is continuoussly vibrated in the mould during the entire compaction procedure, including the removal of the filling surplus.

Concrete blocks or elements produced in this way have, in all directions, dimensions which lie within very narrow limits. Even the dimensions which corresponds to the filling level can, in accordance with the invention, be just as closely adapted to a predetermined value as the dimensions of the finished concrete element which are determined by the side walls of the mould or of the mould chamber. The concrete blocks produced in accordance with the method of the invention are distinguished not only by more precise observance of prescribed measurements, but also by an exceptionally uniform strength. In comparison with known methods of production, a quality of concrete which is on the average better is obtained through a combination of compaction procedure and removal procedure in accordance with the invention when using the same concrete mixture.

Furthermore, an improved apparatus for the production of particularly uniform concrete elements is provided with the invention. To this end, the invention starts from an apparatus for the production of elements made of concrete or similar settable material in an upwardly open mould which can be connected to a compaction device and into which a press ram, the ram plate of which covers the free upper cross section of the mould, can travel from above with a press device. This apparatus, is in accordance with the invention, characterised in that the ram plate is provided with at least one aperture, in which a punch tube is arranged, which is movable in a vertical direction independently of the ram.

An apparatus in accordance with the invention can accordingly work in such a way that during the compaction procedure the ram plate is forced constantly and firmly onto the upper side of the substance present in the mould or a mould chamber, whilst simultaneously, with the separately movable punch tube, some of the substance is punched out from the quantity present in the mould chamber. Preferably the punch tube is rammed several times in succession into the material and by this means a quantity of the material is repeatedly received into the tube. By this means, the quantity of the material that is to be compacted in the mould or mould chamber is reduced and the ram approaches, in the course of the compaction, the intended nominal filling level. Preferably an eccentric device, which operates the punch tube, is arranged above the ram plate in the ram. In accordance with a further feature of the invention, the eccentric device works against the biasing force of a restoring spring, which biases the punch tube back towards its initial position in which the bottom edges of the punch tube lies above the plane containing the bottom surface of the ram plate.

The invention furthermore provides that the removal device, in this case the punch tube, is provided with a mechanism which, after each production run, removes material from the removal device to prepare said device for the next production run. To this end, a suction device can be connected to the punch tube. In a preferred embodiment, the invention provides that a cylinder which fills the cross section of the punch tube is arranged to be movable in the punch tube. At the end of the production run, after the stripping of the moulded elements, the cylinder is forced downwards through the punch tube, in order to eject into the now empty mould any material present in the punch tube.

In the case of a known apparatus, the mould of which is subdivided into a plurality of chambers, also the ram of which is split up into a number of individual ram plates corresponding to the number of chambers in accordance with the invention the punch tubes are fastened to a yoke which, as explained above is operable by an eccentric against the action of a restoring spring. In the same way, the pestles, arranged in the punch tubes for the cleaning, are connected at their upper ends by a yoke, on which an operating device, preferably a hydraulic cylinder acts.

This invention is illustrated by way of example in the accompanying drawings in which:

FIG. 2 shows a removal device of the apparatus of FIG. 1 prior to the commencement of a compaction procedure;

FIG. 3 shows the device of FIG. 2, upon the commencement of the compaction procedure;

FIG. 4 shows the device of FIG. 2 in the first stage of the compaction procedure;

FIG. 5 shows the device of FIG. 2 at the end of the first stage of the compaction procedure;

FIG. 6 shows the device of FIG. 2 shortly before the end of a second stage of the compaction procedure;

FIG. 7 shows the device of FIG. 2 at the end of the second stage of the compaction procedure;

FIG. 8 shows the device of FIG. 2 at the end of the stripping procedure;

FIG. 9 shows the device of FIG. 2 during the removal of superfluous material for a new production;

FIG. 10 shows a simplified representation of a modified embodiment of a removal device in accordance with the invention;

Figure 1:
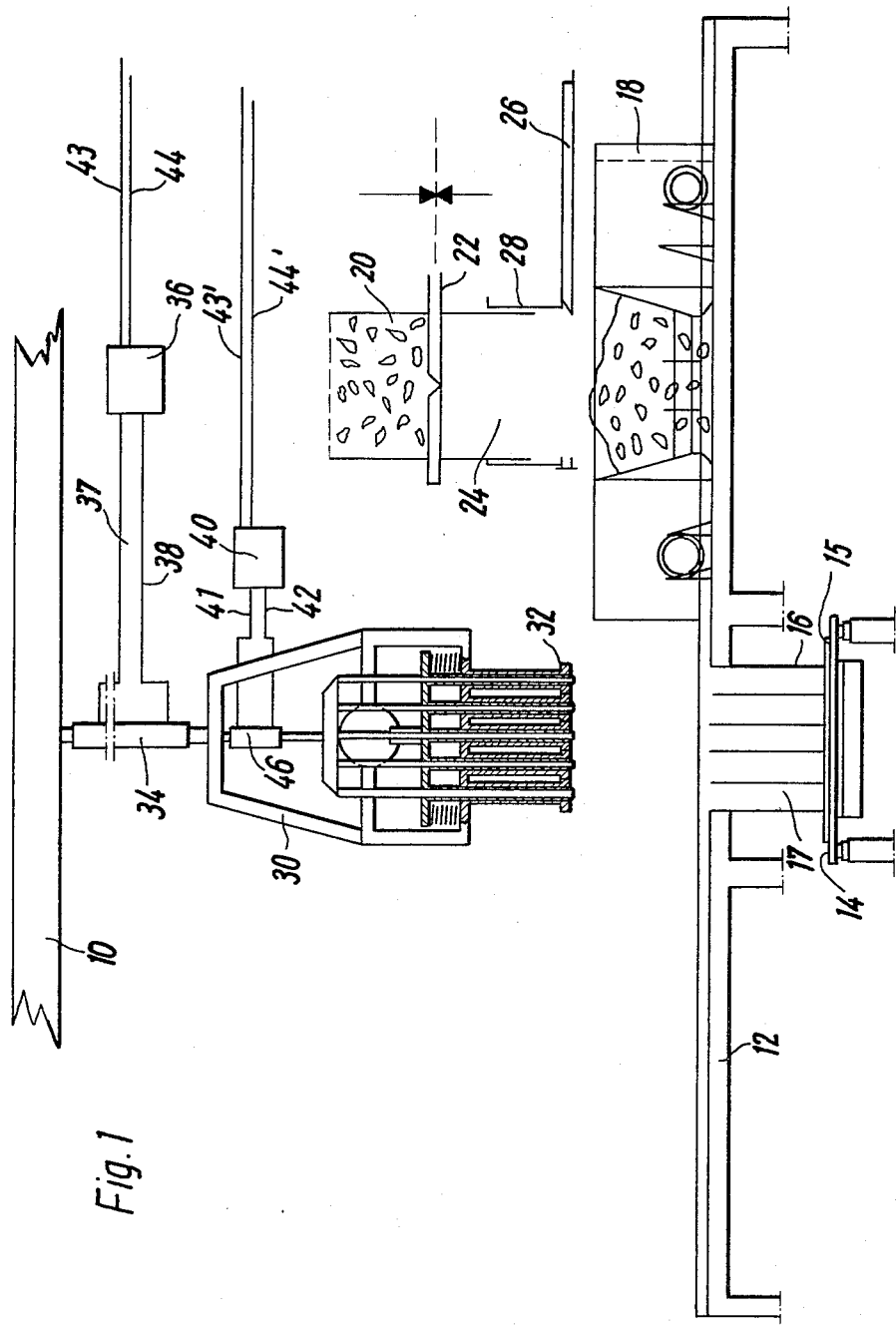
FIG. 1 shows an apparatus in accordance with the invention, in a simplified representation of the parts which are essential for the production run, in which connection all the parts known in accordance with the prior art and omitted.

With reference to FIG. 1 the apparatus has a frame 10 (only partially shown). Arranged in the frame 10 is a table 12, which has a cutaway portion, under which a table 14 is positioned. A pallet 15 lies on the table 14, which is a vibrating table. Placed onto the pallet 15 is a mold frame 16, which is subdivided into individual chambers 17. The mould frame 16 can travel vertically, for the stripping of the compacted blanks. After the raising of the mould frame 16 at the end of a production run the pallet 15 with the blanks present thereon can be extracted from the apparatus and a fresh pallet can be placed onto the table 14.

The mould frame 16 is filled with a charging truck 18, which can travel on the table 12. Arranged above the table 12, in the frame 10, is a storage container 20, the lower part of which forms a metering chamber 24. The metering chamber 24 can be dissociated by slides 22 from the upper part of the storage container 20. The base of the metering chamber 24 is formed by a slide 26 which, in the same way as the slides 22, can be withdrawn laterally from the storage container and be inserted once more. The volume of the metering chamber 24 is variable in that the lowermost part 28 is movable upwards or downwards telescopically. The storage container 20 with the metering chamber 24 is arranged laterally of the mould frame 16 above the table 12. In FIG. 1 the metering chamber 24 just been emptied into the charging truck 18, so that the slide 26 has been pulled to the right. Subsequently the charging truck is run over the mould, so that the quantity of concrete present in the charging truck 18 can drop into the mould frame 16.

A press 30 is arranged above the mould frame 16, inside the frame 10. The press 30, has at its lower end, ram plates 32, which fit precisely into the individual mould chambers 17. The press 30 can be moved in a vertical direction by a double-acting hydraulic cylinder 34, so that after completion of the filling procedure, when the charging truck 18 has been emptied into the mould frame and has subsequently been run back to the side, the ram plates 32 can be run downwards right into the mould chambers 17 of the mould frame 16. To this end, pressurised fluid is fed to the hydraulic cylinder 34 via a control device 36. The control device is connected via lines 37, 38 to the upper or lower end respectively of the hydraulic cylinder 34. The control device 36 is connected by a pipe 43 to a source of pressurised fluid (not shown). A pipe 44 leads from the control device 36 to a source of pressurised fluid, which is likewise not shown.

Provided in the press 30 there is, in addition, a further double-acting hydraulic cylinder 46, the function of which is explained later on. The hydraulic cylinder 46 is operated from a control device 40, which is connected via lines 41, 42 to the upper or lower end respectively of the hydraulic cylinder 46. The control device 40, is for its part, connected by a pipe 43' to a source of pressurised fluid and by a pipe 44' to a source of pressurised fluid which are likewise not shown and can be identical to the source for the control device 36.

The press 30, see FIGS. 2 to 9 is in accordance with the invention provided with a removal device, which allows material to be removed from the mould during the compaction procedure without the compaction procedure to be interrupted. To, this end, each ram plate 32 is provided with at least one aperture, through which a tube 50 is movable vertically up and down independently of the movement of the press 30. In FIG. 2 the tube 50 is raised to such an extent that the lower edge of the tube is flush with the surface formed by the underside of the ram plate 32. The lower edge of the cylindrical tube 50 forms a cutting edge. To this end, the inner surface of the tube 50 is joined by a conical surface 51 to the lower edge of the outer surface of the tube 50. The tube 50 preferably has a circular cross section. For special purposes, a cross-sectional shape deviating from the circular shape can be provided.

The press 30 has a framework 52, the lower parts 54 of which retain the ram plates. The parts 54 also act as guides for the tubes 50. To this end, the parts 54 can also be tubes. Instead, the mounting supports for the ram plates 32 can be rails, which are separated by a distance equal to the outer circumference of the tube 50, so that a tube 50 inserted into this space is guided on the rails.

The tubes 50 of a press 30 are securely connected to one another by a yoke 56. The yoke 56 is braced by a spring 58 on the framework 52 of the press 30 in so that the tubes 50 are biased towards their upper position, see FIG. 2. Arranged on a transverse 64 of the framework 52 is an eccentric 60, which is connected to the yoke 56 by means of a guide rod 62.

Arranged in the tubes 50 are pestles 66, which completely fill the aperture cross section of a tube 50. The pestles 66 extend through correspondingly designed apertures in the yoke 56 and in the traverse 64 and are fastened to a yoke 68, on which the double acting hydraulic cylinder 46 acts, the other end of which is braced on the framework 52 of the press.

FIG. 2 shows the removal device before the commencement of a compaction procedure. The mould chamber 17 of the mould frame 16, which are arranged on the pallet 15, are filled with the settable substance, beyond the intended height of the element that is to be produced. This height is indicated by the arrow tip 70, see FIG. 2.

In accordance with FIG. 3, the compaction mechanism 30 has been moved downwards through the action of the hydraulic cylinder 34, so that the ram plates 32 have already penetrated somewhat into the upper part of the mould chambers 17. During this procedure, the mould frame is vibrated with the jarring devices acting on the table 14.

Since the mould chambers 17 are filled with an excess of substance, initially, despite vibration and impressing of the ram plates 32, a state of compaction is achieved which precludes any further penetration of the ram plates. On the other hand, the ram plates 32 lie with their underside still considerably above the intended production level 70. Whilst the ram plates 32 are forced further onto the surface of the material in the mould chambers 17 (see FIG. 4) through the eccentric 60 and contrary to the biasing force of the spring 58 the tubes 50 are forced into the substance and raised once more, see FIG. 5. In this connection the part which has penetrated into the tubes 50 from the filling of the mould chamber 17 is also moved upwards, so that the ram plates 32 are constantly acted upon further in the downward direction, penetrate deeper into the mould chamber 17, see FIG. 5. The underside of the ram plates 32 draws in this connection nearer to the intended level 70. During the entire removal procedure, the ram plate remains pressed firmly onto the settable substance. Also the jarring procedure does not need to be interrupted. Subsequently the removal procedure, see FIGS. 6 and 7 is repeated. In this connection, the ram plate reaches the intended depth of penetration, which corresponds to the height of the element that is to be produced. As soon as this level is reached, see FIG. 6, the vibrating procedure is shut off. To this end, corresponding control means, such as light barriers, limit switches can be provided. The eccentric movement is, in this connection, also switched off, and the spring 58, see FIG. 7, restores the tubes 50 into their initial position, in which the lower edge of the tubes 50 is drawn back into or beyond the plane containing the underside of the ram plates 32. Through the bevel 51 on the lower edge of the tubes 50, the surplus quantity punched out of the mould chambers has been firmly wedged in the tubes 50, so that this surplus quantity cannot readily drop out of the tubes once more. After the final upwards movement of the tubes 50, in each case a recess A remains behind in the ready compacted blanks in the mould chambers 17. For most purposes of elements of this kind it can be arranged that the side, having the recess, of the element is masked by neighbouring elements upon a subsequent production run taking place and is therefore not disturbed.

After the raising of the tubes 50, see FIG. 7, the entire press 30 is moved upwards, see FIG. 8, by means of the cylinder 34 which is moved in the upwards direction by the control device 36. At the same time, the mould frame 16 is raised. After that the blanks F present on the pallet, together with the pallet 15, can be removed from the apparatus of the invention and a fresh pallet can be placed onto the table 14. The mould chamber 16 is thereupon again moved downwards and placed onto the new pallet 15. At the same time, the hydraulic cylinder 16 is acted upon in the downwards direction, so that the pestles 66 pass through the tubes 50 and eject the material present therein and removed during the preceding production run, into the mould chambers 17 present thereunder, see FIG. 9. Subsequently, a new production run begins with filling and compacting.

FIG. 10 shows a modification, according to which a cylinder 80 is used instead of an eccentric 60. The cylinder 80 can also be double-acting, so that the spring 58 can be dispensed with in the case of this arrangement. A further modification of this embodiment consists in that no pestles, but compressed air, is used for emptying the tubes 50. To this end, connected to the upper ends of the tubes 50 are compressed-air hoses 82, which can be connected to a source of compressed air (not shown) via a switch 84.

Figure 11:
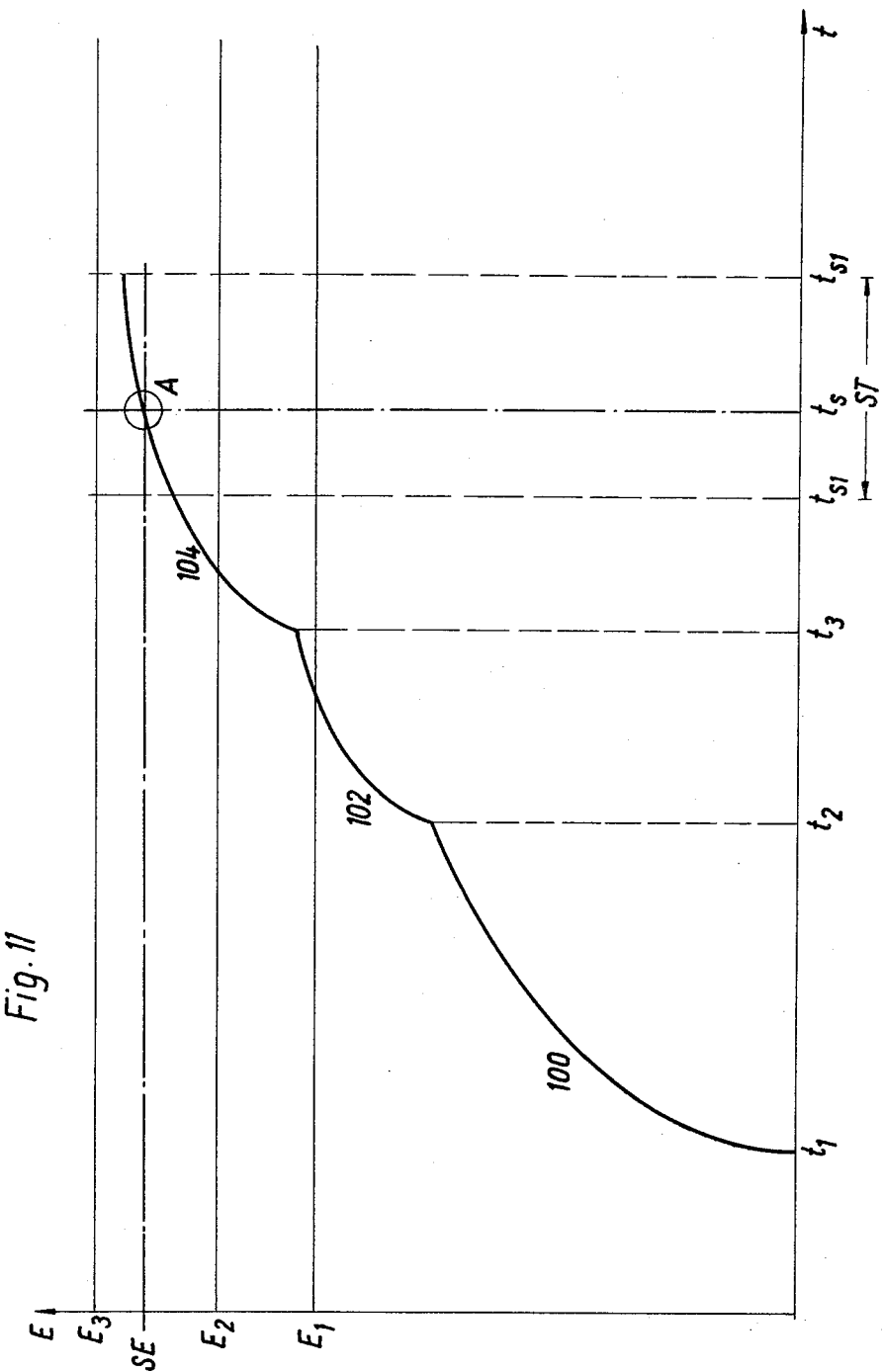
FIG. 11 shows a graphic representation of a first embodiment of a method according to the invention.
Figure 12:
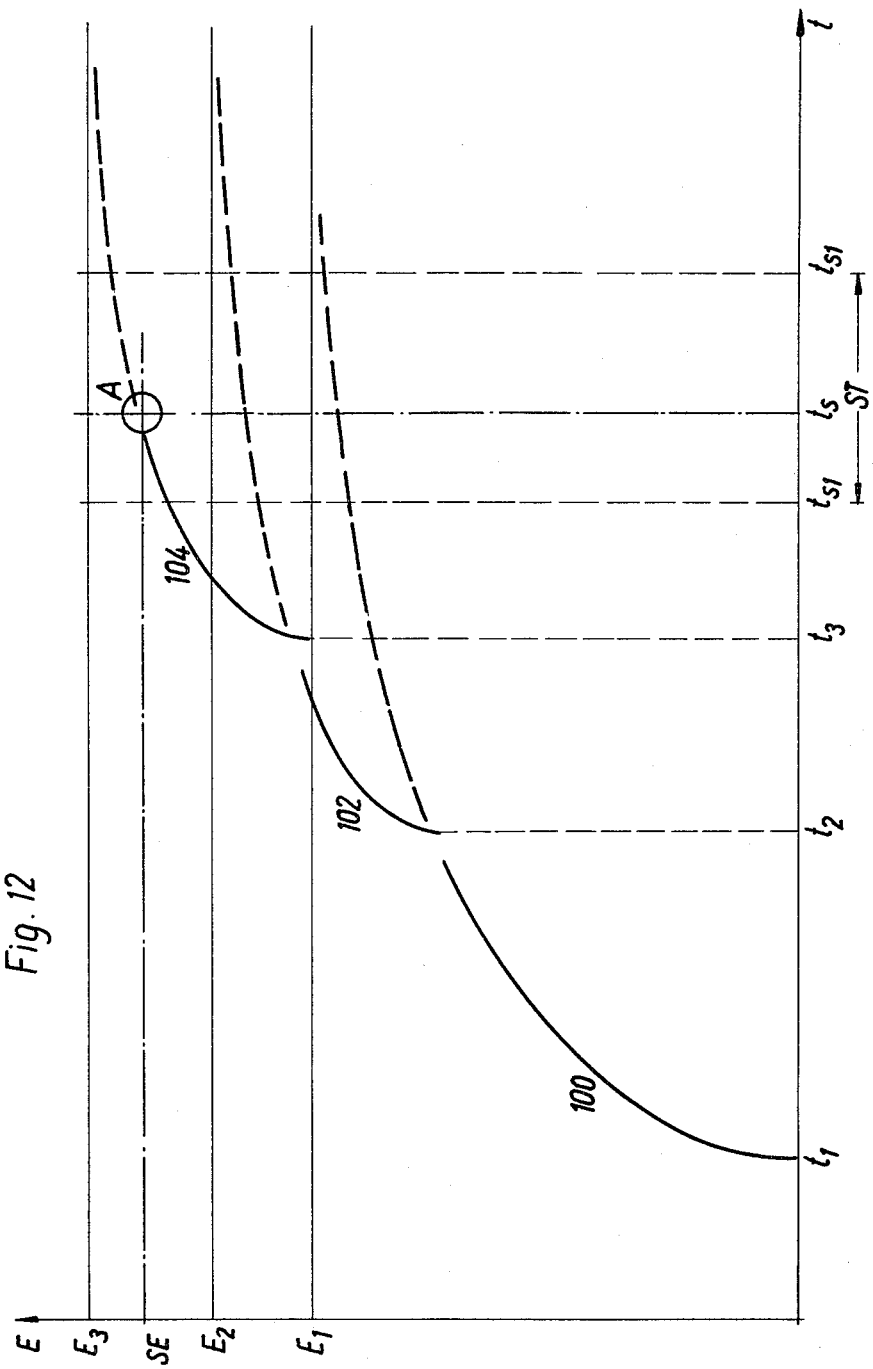
FIG. 12 shows a representation, corresponding to FIG. 11 of an alternative method in accordance with the invention.

FIGS. 11 and 12 show simplified diagrams of the compaction procedure of the invention. Marked off on the abscissa is respectively the time ($t$) and on the ordinate the depth of penetration (E) of the ram. The predetermined depth of penetration $S_e$ is to be achieved at a time $t_s$, which can fluctuate within a small interval $S_t$. The curve 100 shows in both diagrams the commencement of a normal compaction procedure, which when carried out in accordance with the prior art methods asymptotically a limit value $E_1$. In accordance with the invention, through the afore-described apparatus on the upper part of the completely solid curve line 100 an individual quantity of the filling surplus is removed from the mould. The point in time $t_2$, i.e. the commencement of the branch 102 of the curve, corresponds approximately to FIG. 5, i.e. to the section of the working cycle at which, through the raising up of the removal device, a renewed more severe compaction becomes possible. In this connection, the ram already exceeds a depth of penetration $E_1$, which, upon a single compaction, would be the maximum depth of penetration of the ram. Through renewed raising and forcing in of the removal device, beginning at the point in time $t_3$, there emerges the curve branch 104, on which at the time $t_s$ the intended depth of penetration SE is reached, to which the curve point A corresponds. In this connection, also the limit value for the curve branch 102, $E_2$ is exceeded. The point A of the curve 104 lies between the limit values $E_2$ and $E_3$. The entire compaction including the gradual removal of individual quantities of the filling surplus needs approximately 10 seconds or less. Nevertheless, a considerable more uniform compaction is achieved in comparison with known methods. Through multiple removal of only small quantities, the predetermined values for the final level of the settable substance in the mould after the compaction and for the degree of compaction are approached extremely accurately.

FIG. 12 shows a corresponding graphic representation for a simplified apparatus in which a removal device projecting at the bottom in FIG. 4 from the ramplate 32, of the punch tube 50 is securely connected to the ram plate. For the consecutive removal of partial quantities of the filling surplus from the mould, in each case the ram plate is raised temporarily from the surface of the substance in the mould, see the gap between the completely solid curve branch 100 and the subsequent completely solid curve branch 102. The same applies to the repetition step of the removal procedure, see the gap between the curve branch 102 and 104.

We claim:

1. An apparatus for the production of small structural elements from concrete or a similarly compactable and settable material, said apparatus comprising an upwardly open mould to be filled with said material, a vertically reciprocable press ram above said mould and having a lower ram plate which fits exactly into the free upper cross section of said mould, said ram plate being provided with at least one aperture in which a punch tube, for removing filling surplus from the mold, is mounted for vertically reciprocable motion, and driving means connection to said punch tube and to said press ram for moving said punch tube independently of the ram.

2. An apparatus as claimed in claim 1, in which the tube has a cross-sectional area which is rectangular in the axial direction, and in which the bottom edge is bevelled outwardly for the formation of a cutting edge.

3. An apparatus as claimed in claim 1, in which a power-operated eccentric arranged inside the press acts on the punch tube.

4. An apparatus as claimed in claim 1, in which the punch tube is movable in the downward direction by means of a hydraulic cylinder.

5. An apparatus as claimed in claim 1, in which the punch tube is biased, by a restoring spring braced on the press to a position in which the bottom edge of the punch tube is moved upwards into a plane containing the underside of the ram plate.

6. An apparatus as claimed in claim 1, in which the punch tube is provided with a cleaning device.

7. An apparatus as claimed in claim 6, in which a pestle which fills the cross section of the tube is arranged so as to travel in the axial direction in the tube.

8. An apparatus as claimed in claim 6, in which the tube can be connected to a source of compressed air.

9. An apparatus as claimed in claim 1, in which the tube is arranged in a guide which at the same time carries, at its lower end, a ram plate.

10. An apparatus as claimed in claim 7, in which the pestle is operable with a double-acting hydraulic cylinder.

11. An apparatus as claimed in claim 1 including a mould frame which is divided up into several upwardly open chambers, in which connecting the press ram consists of a number of individual ram plates corresponding to the chambers, and which the tubes respectively associated with the individual ram plates are fastened together on a yoke on which an operating device arranged in the press acts.

12. An apparatus as claimed in claim 11 in which the pestles of the individual tubes are connected by a yoke to a common operating cylinder.

References Cited

UNITED STATES PATENTS 2,341,072  2/1944  Billman et al. _____ 25—41 TX

FOREIGN PATENTS 22,067  10/1896  Great Britain _____ 25—44

J. SPENCER OVERHOLSER, Primary Examiner

D. S. SAFRAN, Assistant Examiner

U.S. Cl. X.R.

425—358, 421